United States Patent [19]

Shrinkle et al.

[11] Patent Number: 5,381,281
[45] Date of Patent: Jan. 10, 1995

[54] DISK DRIVE SYSTEM USING MULTIPLE EMBEDDED QUADRATURE SERVO FIELDS

[75] Inventors: Louis J. Shrinkle; John P. Squires, both of Boulder, Colo.

[73] Assignee: Conner Peripherals, Inc., San Jose, Calif.

[21] Appl. No.: 83,192

[22] Filed: Jun. 24, 1993

Related U.S. Application Data

[63] Continuation of Ser. No. 860,299, Mar. 27, 1992, abandoned, which is a continuation of Ser. No. 780,443, Oct. 17, 1991, abandoned, which is a continuation of Ser. No. 386,504, Jul. 27, 1989, abandoned.

[51] Int. Cl.$^6$ ............................................. G11B 5/596
[52] U.S. Cl. .................................................. 360/77.08
[58] Field of Search ............... 360/77.08, 77.11, 78.14, 360/135, 78.06

[56] References Cited

U.S. PATENT DOCUMENTS

| | | | |
|---|---|---|---|
| 4,068,269 | 1/1978 | Commander et al. | 360/78.14 |
| 4,238,809 | 12/1980 | Fujiki et al. | 360/131 |
| 4,530,019 | 7/1985 | Penniman | 360/77.08 |
| 4,530,020 | 7/1985 | Sutton | 360/77.04 |
| 4,590,526 | 5/1986 | Laatt et al. | 360/78.06 |
| 4,602,304 | 7/1986 | Fultz | 360/77.05 |
| 4,631,606 | 12/1986 | Sugaya | 360/77.08 |
| 4,669,004 | 5/1987 | Moon et al. | 360/77.08 X |
| 4,688,119 | 8/1987 | Blessum | 360/77.08 |
| 4,823,212 | 4/1989 | Knowles et al. | 360/135 X |
| 4,910,617 | 3/1990 | Brunnett et al. | 360/135 X |
| 5,095,393 | 3/1992 | Janz | 360/77.05 |

FOREIGN PATENT DOCUMENTS

| | | | |
|---|---|---|---|
| 62-003475 | 1/1987 | Japan | 360/77.08 |
| 01154376 | 6/1989 | Japan | 360/77.08 |

OTHER PUBLICATIONS

"Servo Zones Embedded in Data Tracks Solve Old, But Create New Problems", Brett Smith, Vermont Research Corp. (Spring 1988), pp. 45, 46 and 48.

Primary Examiner—David L. Robertson
Attorney, Agent, or Firm—Fliesler, Dubb, Meyer & Lovejoy

[57] ABSTRACT

A quadrature based embedded servo control system is provided to realize a high track density, high-performance hard disk drive system. Each data sector includes a gray code field spanning the entire width of the data track and a quad-servo burst pattern having first, second, third, and fourth servo burst fields distributed along the length of a portion of the data sector. The center point of the first, second, third, and fourth servo bursts are sequentially offset from the adjacent burst by a radial distance equivalent to one-half of the data track width. The quad-servo burst pattern is used with a track-following algorithm based on the quadrature value of $(A+B)-(C+D)$ to obtain a substantially increased servo lock range. A second gray code field extending substantially the width of the data track and second quad-servo burst pattern substantially identical to the first is provided near a mid-point in the data portion of the data sector to increase the servoing information sample rate and accuracy, thereby permitting substantially increased data track densities to be utilized.

18 Claims, 8 Drawing Sheets

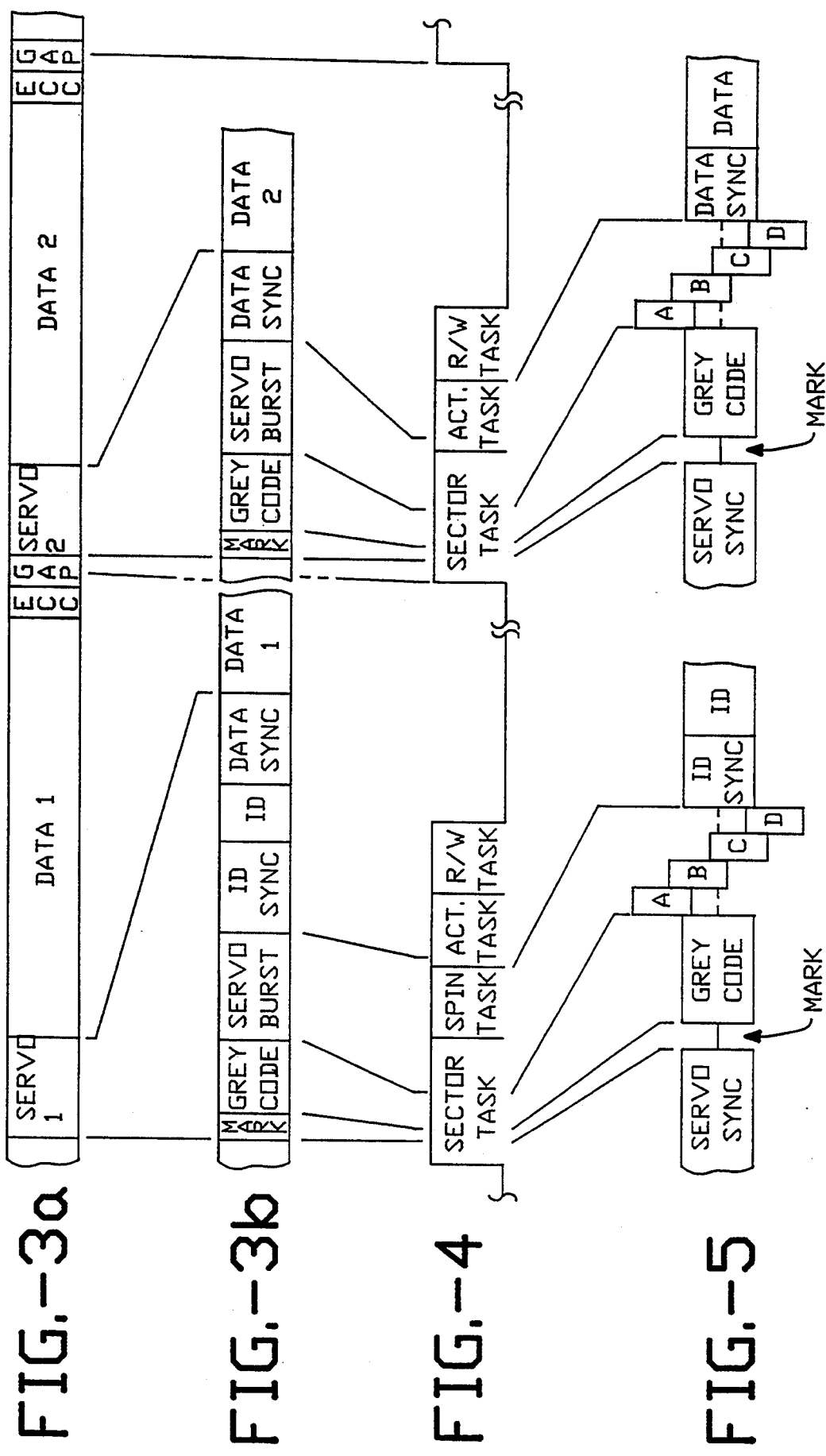

DISK DRIVE SYSTEM USING MULTIPLE EMBEDDED QUADRATURE SERVO FIELDS

CROSS REFERENCE TO RELATED APPLICATION

This application is a continuation of Ser. No. 07/860,299, filed Mar. 27, 1992, now abandoned, which is a continuation of Ser. No. 07/780,443, filed Oct. 17, 1991, now abandoned, which is a continuation of Ser. No. 386,504, filed Aug. 27, 1989, now abandoned.

The present application is related to the following Applications, all assigned to the Assignee of the present Application:

1. DISK DRIVE SYSTEM CONTROLLER ARCHITECTURE, invented by John P. Squires, et al, application Ser. No. 057,289, filed Jun. 2, 1987, now U.S. Pat. No. 4,979,056;
2. DISK DRIVE SOFTWARE SYSTEM ARCHITECTURE, invented by John P. Squires, et al, application Ser. No. 057,806, filed Jun. 2, 1987;
3. DISK DRIVE SYSTEM CONTROLLER ARCHITECTURE UTILIZING EMBEDDED REAL-TIME DIAGNOSTIC MONITOR, invented by John P. Squires, et al, application Ser. No. 058,289, filed Jun. 2, 1987, now U.S. Pat. No. 4,979,055;
4. LOW POWER HARD DISK DRIVE SYSTEM ARCHITECTURE, invented by John P. Squires and Louis P. Shrinkle, application Ser. No. 152,069, filed Feb. 4, 1988;
5. VOICE COIL ACTIVATED DISK DRIVE PARKING DEVICE WITH MAGNETIC BIAS, invented by Kurt Michael Anderson, application Ser. No. 269,573, filed Nov. 10, 1988, now U.S. Pat. No. 4,985,793.

FIELD OF THE INVENTION

The present invention generally relates to closed-looped, embedded servo disk drives and their control systems, and, in particular, to a disk-drive control system utilizing a nearly continuous band gray code and a quadrature servo pattern field provided one or more times per track sector.

BACKGROUND OF THE INVENTION

Disk drive systems utilizing closed-looped head positioning control systems rely on servo data stored on the rotating disks as the source of data track positioning feedback information. One approach to providing such servo information is to dedicate an entire disk surface and corresponding servo read data channel for the near-continuous sourcing and capture of positioning information. However, dedication of an entire disk surface and the need to provide special servo control read circuitry results in a significant increase in the cost per unit data of the disk drive control system and disk drive as a whole.

An alternate approach is to provide servo information within each track sector on every data surface of the disk drive system, i.e., embedded servo. Conventionally, A/B servo bursts of constant frequency and amplitude servo information are recorded as sequential fields within the sector header of each data sector. The servo burst fields are written symmetrically offset from and on respective sides of the data track center line by at least one-half of the head width. That is, the servo bursts do not overlap the track center line. Consequently, the differences between the relative voltage amplitudes, $(V_A - V_B)$, as read by the head while track following, may be utilized as a direct indication of the distance and direction of the head from the track center line.

There are, however, a number of drawbacks to providing servo information in each sector header. Since the servo information is in-line with the sector data, the percentage of sector length available for storing user data is reduced. The aggregate reduction in user data storage space is often many megabytes, if not tens of megabytes, as a consequence of using embedded servo information.

Another problem with conventional embedded servo systems is that the servo information is received only once per sector. Each sector, however, follows a uniform arc proportional to its radial distance from disk center. There are non-linear forces acting on the actuator arm and head that require active compensation. These forces include shock and vibration, and to a lesser extent, the air drag of the arm and head and the torquing force of the flex circuit. However, such forces and any error in the previous position correction will result in head drift that remains uncompensated until the next sector's servo burst can be obtained and a new correction applied.

Head drift during a sector read operation will result in data errors if the drift is significant. Conversely, excessive drift during a write operation is unacceptable due to the compromise of data stored on adjacent tracks. Therefore, track spacing is predominantly limited by the accuracy or tightness of the servo control loop, that is, in turn, dependent on sector length and disk rotation rate, i.e., the effective frequency of occurrence of servo bursts with respect to the read head.

Another limitation of A/B servo burst control systems arises from the extent of off-track error that can be unambiguously determined based on the servo burst fields. Whether as the end condition of a seek operation or the consequence of vibration or mechanical impact, a read head may be at a position substantially offset from the desired track center line. Beyond an off-track range limit from track center line, the servo control loop will fail to produce a proper position correction as a consequence of reading servo burst data from an adjacent track. The servo control loop will therefore issue an inaccurate position correction or incorrectly select the then closest track center line as being the desired track center line for track following. A time-consuming additional seek operation is then required to change tracks. Typically the off-track capture range of A/B burst servo control systems is no more than about $\pm \frac{3}{8}$ of a track width.

The conventional A/B servo burst pattern itself may give rise to loss of tracking accuracy as a consequence of incorrect placement of the servo burst fields. Track formatting, or servo track writing, is done to provide the servo burst fields as part of the initial drive fabrication. Although done under the electromechanical control of a precision servo writer controller, variances due to vibration, out of round spindle bearings, and nonlinearities in the servo writer's own mechanics will result in one or more servo bursts being written offset from their ideal location. Surface defects can also distort the shape and effective position of servo bursts. If left uncorrected, subsequent track following operations will follow an improper track center line or slip entirely off track. For conventional A/B burst patterns, the off-track error is equal to the net servo burst field offset error. Typically, data sectors having incorrectly written servo bursts are marked as simply unusable.

Another concern relevant to the use of embedded servo is the consequence of increased track density. Conventional A/B burst patterns are written by a servo pattern writer using a series, typically four, of write head passes. This results in a series of overlap erasures of the partial patterns written during prior passes. The erasure is a consequence of a fringe electromagnetic field extending beyond the head element when the head is energized to write. The problem is that, as the track density is increased, the proportion of the servo bursts that are fringe field erased increases. That is, the total width of the bursts perpendicular to the track center line is decreased, but the width of the erasure is constant. Consequently, there is a loss of track following accuracy due to the decreased ability to discriminate track offset errors based on the decreased recoverable signal strength of the A/B servo bursts.

Quad-burst servo field patterns have been proposed for use in embedded servo systems. U.S. Pat. No. 4,669,004 discloses a quad-burst pattern where one of four sequential servo fields is disposed symmetrically across the track center line, two others are symmetrically offset from the track center line, and a fourth field is asymmetrically disposed well above the track center line. This burst pattern identically repeats every fourth track at the same sector.

The individual burst offsets are related as integer multiples of less than or equal to one-half of the head width. Each servo field is identically provided with absolute track identification information as well as a track center line relative burst field. The significance of providing four such servo fields, as opposed to just two servo bursts, is that all modes of track-seeking, up to a preset maximum seek rate, will result in the read head crossing substantially over at least one of the servo fields.

The quad-burst servo pattern disclosed in U.S. Pat. No. 4,669,004, however, is also sensitive to servo burst offset errors. Although four servo bursts are present, only two of the bursts are used in determining the relative off-track center line distance and direction. These two bursts are functionally and positionally equivalent to the A/B bursts. Accordingly, this quad-burst servo system obtains no better insensitivity to servo burst position offset errors than the conventional two-burst servo pattern systems. Further, another limitation of the quad-burst servo pattern of U.S. Pat. No. 4,669,004 is that it appears to place a constraint on the track pitch based on the width of the read/write head.

SUMMARY OF THE INVENTION

Therefore, a general purpose of the present invention is to provide a high performance embedded servo disk drive control system suitable for use in high-track density disk drive systems.

This is accomplished in the present invention by providing a quadrature algorithm-based servo control hard disk drive system wherein each data sector includes a gray code field spanning the width of the data track and a quad-servo burst pattern having first, second, third, and fourth servo bursts distributed in a series along the length of a portion of the data sector, the center point of each first, second, third, and fourth servo burst being offset from its adjacent bursts by complementary radial distances equivalent to one-half of the data track width. Another aspect of the present invention is the provision of a second gray code field spanning the width of the data track and second quad-servo burst pattern located near a sector mid-point in the data portion of each sector.

Thus, an advantage of the present invention is that the actuator seek rate is not limited by the nature of the track identification information or its presentation as part of the embedded servo information.

Another advantage of the present invention is that it provides a substantially increased servo lock or track-following range of approximately $\pm\frac{3}{8}$ of a track width as measured from track center line.

A further advantage of the present invention is that it provides for a true quadrature-based track following algorithm. A difference of sums of servo burst pair read voltages provides a substantially increased degree of accuracy in determining both position and direction to the current track center line. In addition, any misposition of the servo burst fields, relative to one another and track center line results in a track following error of no more than one-half of the net error offset of the servo bursts.

Still another advantage of the present invention is that the provision of the quad-servo burst pattern of the present invention does not limit track pitch as a function of head width due to the fringe field erasure phenomenon.

A still further advantage of the present invention is that the provision of a second, mid-sector gray code and quad-burst servo pattern doubles the effective servo information frequency, resulting in substantially improved track following accuracy that, in turn, allows a substantially increased track density to be realized.

Another significant advantage of the present invention is that the quad-servo burst fields may be relied on selectively during servo-track writing to correct previous servo writer errors, thereby substantially reducing the aggregate sensitivity of the servo writing process to errors and the number of unusable sectors.

Other advantages of the present invention include adaptability to the use of data heads having a read profile width significantly smaller than their write profile width, such as magneto-resistive heads, and glass substrate disks.

BRIEF DESCRIPTION OF THE DRAWINGS

These and other advantages and features of the present invention will become apparent when considered in conjunction with the following detailed description of the present invention and the drawings, wherein like reference numerals designate like parts throughout the figures thereof, and wherein:

FIGS. 3a–b illustrate the distribution of servo control information and data in a simple, exemplary sector as provided in accordance with the present invention;

FIG. 4 illustrates the task management control system flow structure of the microcontroller of the present invention in processing the servo control information of the sector shown in FIGS. 3a–b;

FIG. 5 illustrates the detailed presentation of the servo control information of the exemplary sector, shown in FIGS. 3a–b, as provided in accordance with the present invention;

DETAILED DESCRIPTION OF THE INVENTION

Figure 1:
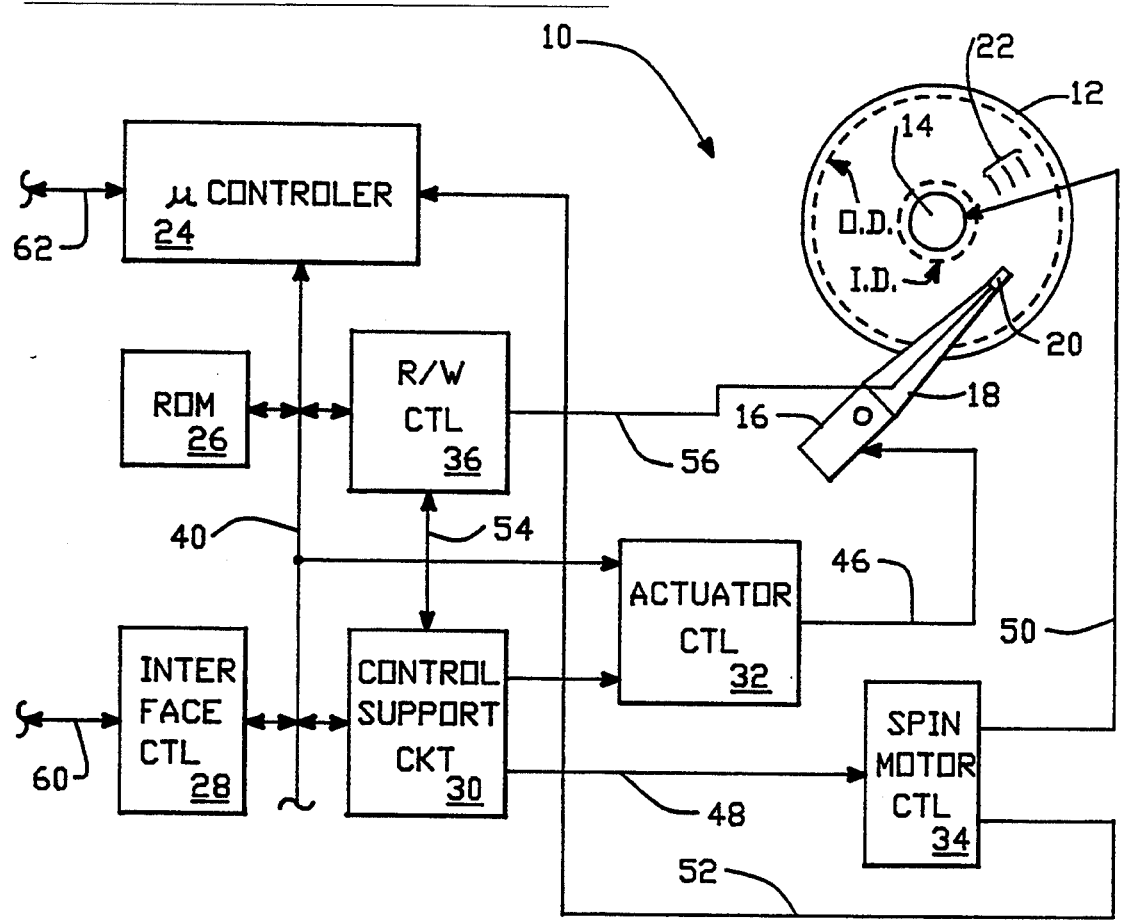
FIG. 1 is a simplified block diagram of a disk drive control system consistent with the present invention.

A disk drive system consistent with the principles of the present invention, general indicated by the reference numeral 10, is shown in FIG. 1. The preferred embodiments of the present invention utilize an embedded microcontroller control system to manage and direct all essential functions of the mechanical aspects of the disk drive system. The drive system includes one or more disks 12 spun in parallel planes by a spindle motor 14. Data is stored in a data track band on each surface of a disk 12 defined by an outer (OD) and inner (ID) track diameter. An actuator assembly 16, including an arm and load beam 18 and a read/write head 20, is utilized to transfer data with respect to concentric data tracks 22 within the track band. Thus, the primary control aspects include controlling the spin rate of the spindle motor 14 and the control of the actuator assembly 16 in positioning of the read/write head 20 for the transfer of data with respect to a preselected data track 22.

A microcontroller 24 and a minimum number of dedicated control support circuits direct all functions of the drive system 10. The electronic architecture of the present invention is described in detail in the co-pending related applications DISK DRIVE SYSTEM CONTROLLER ARCHITECTURE, DISK DRIVE SOFTWARE SYSTEM ARCHITECTURE, DISK DRIVE SYSTEM CONTROLLER ARCHITECTURE UTILIZING EMBEDDED REAL-TIME DIAGNOSTIC MONITOR, LOW POWER HARD DISK DRIVE SYSTEM ARCHITECTURE, and VOICE COIL ACTIVATED DISK DRIVE PARKING DEVICE WITH MAGNETIC BIAS; and are incorporated herein by reference. However, for purposes of completeness, the pertinent portions of the disclosures are set forth below.

In the preferred embodiments of the present invention, the microcontroller 24 is a three megahertz clock rate Motorola MC68HC11 HCMOS single chip microcontroller, as described in the MC68HC11A8 HCMOS Single Chip Microcomputer Technical Data Book (ADI 1207) available from Motorola, Inc., Motorola Literature Distribution, P.O. Box 20912, Phoenix, Ariz. 85036.

A read-only memory (ROM) 26 is coupled to the microcontroller 24 by way of a general purpose data, address and control bus 40. The ROM 26 is utilized to store a microcontroller control program for supporting five principle tasks necessary to implement the full functionality of the disk drive system 10. These tasks include interface, actuator, spin motor, read/write and monitor.

An interface control circuit 28 is provided to support the microcontroller 24 in execution of the interface task. The interface controller 28, in a preferred asynchronous SCSI embodiment of the present invention, is implemented as a Cirrus Logic CL-SH250 Integrated SCSI Disk Controller, manufactured and distributed by Cirrus Logic, Inc., and described by their CL-SH250 Technical Data Sheet, available from Cirrus Logic, Inc., 1463 Centre Pointe Drive, Milpitas, Calif. 95035. A comparable synchronous SCSI interface controller, the AIC-6110, is available from Adaptec, Inc., 691 South Milpitas Boulevard, Milpitas, Calif. 95035. A functionally equivalent interlace controller, suitable for interfacing to the IBM Personal Computer Model "AT" peripheral bus, is also available from Cirrus Logic, Inc.

The interface controller 28, in general, provides a hardware interface between the disk drive system 10 and a host computer system, typically a data processing system, via an SCSI communications bus 60. Thus, the interface controller 28 operates to manage bi-directional data streams between the communications bus 60 and the bus 40.

An actuator controller 32 is provided as an internal interface between the microcontroller 24 and actuator assembly 16. The actuator controller 32 provides for digital-to-analog conversion of a digital position control word and the current buffering of the resultant analog voltage provided on line 46 to the voice coil motor of the actuator assembly 16. The digital word, as provided via the bus 40 from the microcontroller 24, represents the desired actuator position. Enabling of the actuator controller 32 in general is provided via the control support circuit 30 via control lines 44. The control support circuit 30, to this end, acts as a parallel port expander for latching a control data word also provided by the microcontroller 24 via the bus 40.

A read/write controller 36 similarly acts as an internal interface between the bus 40 and the read/write heads of the actuator assembly 16 via the raw data lines 56. The read/write controller 36 functions to provide for the buffered serialization/deserialization and data clock encoding/decoding of data. Configuration and initiation of read/write controller 36 functions are performed under the direct control of the microcontroller 24 by the transfer of control and data words to the read/write controller 36 via the bus 40.

Finally, a spin motor controller 34 is provided to directly support the commutation of the spin motor 14 via the commutation current lines 50. Commutation state selection is effected by provision of a digital word from the microcontroller 24 to the control support circuit 30. This digital word is latched and provided on the commutation select lines 48 to the spin motor controller 34. A commutation current is switched by the spin motor controller 34 to a corresponding field winding phase pair of the spin motor 14 via the commutation current lines 50. A voltage proportional to the current conducted through the selected field winding phase pair of the spin motor 14 is provided via the feedback line 52 to an analog-to-digital converter input of the microcontroller 24.

The mechanical configuration of the disk drive embodying a preferred embodiment of the present invention is described in VOICE COIL ACTIVATED

DISK DRIVE PARKING DEVICE WITH MAGNETIC BIAS and is incorporated herein by reference. The aspects of the mechanical structure pertinent to the present invention are set forth in Table 1 and Table 2 below.

TABLE 1

| Number Data Cylinders | 1368 cylinders |
|---|---|
| Sectors per Track | 39 sectors |
| Number of Disks | 4 |
| Number of Data Surfaces | 8 |
| Bytes per Sector | 662 bytes |
| Data Bytes per Sector | 512 bytes |
| Data Capacity per Data Surface | 27.3 Mbytes |
| Total Data Capacity | 219 Mbytes |

TABLE 2

| Disk Diameter | 96 millimeters |
|---|---|
| Data Track Band Width | 30 millimeters |
| Track Density | 1700 tracks/inch |
| Bit Density (max) | 22,000 fci |
| Head Width | 11 micrometers |
| Track Width | 15 micrometers |

Figure 2:
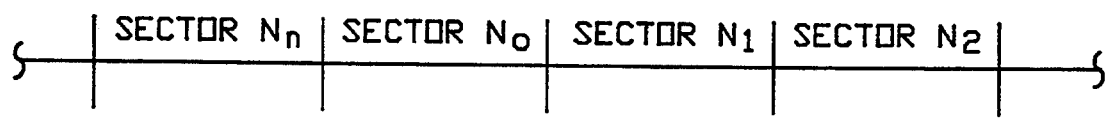
FIG. 2 is a simplified representation of a portion of a data track with the plurality of sectors provided thereon.

As generally represented in FIG. 2, each track of the concentric data tracks 22 provided on the surface of a disk 12 are further subdivided into sectors $N_{0-n}$. In accordance with the present invention, and as generally shown in FIG. 3a, each sector is composed of a servo 1 field, a data 1 field, first error correction code (ECC) field, mid-sector gap field, servo 2 field, data 2 field, second ECC field, and final gap field. As shown in FIG. 3b, the servo 1 field is further composed of a servo mark field, gray code field, servo burst field, ID sync field, ID field, and data sync field. Similarly, the servo 2 field is composed of a second sector mark field, second gray code field, and servo burst field and finally, a data sync field. The order and size of these fields are set forth in Table 3.

TABLE 3

| Half Sector "A" Field | Bytes | Half Sector "B" Field | Bytes |
|---|---|---|---|
| Servo Sync | 3 | Servo Sync | 3 |
| Gray Code | 8 | Gray Code | 8 |
| Servo Burst A | 4 | Servo Burst A | 4 |
| Servo Burst B | 4 | Servo Burst B | 4 |
| Servo Burst C | 4 | Servo Burst C | 4 |
| Servo Burst D | 4 | Servo Burst D | 4 |
| Pad | 1 | Pad | 1 |
| ID Sync | 12 | Data Sync | 12 |
| ID (Header) | 4 | Data | 267 |
| ID CRC | 2 | ECC | 7 |
| Pad | 4 | Gap | 17 |
| Data Sync | 12 | | |
| Data | 245 | | |
| ECC | 7 | | |
| Gap | 17 | | |
| 331 Bytes (1st half) | | 662 Bytes Total | |

The sector mark fields are provided to synchronize the microcontroller with the control information present in the remaining portions of the servo 1 and 2 fields as well as the data 1 and 2 fields. The gray code fields provide an unambiguously encoded track number. The unambiguous coding of the gray code values is further qualified in that the gray code values of like sectors on adjacent tracks differ by a single bit and that no more than two consecutive zero bits are allowed in a valid gray code value.

The servo burst fields, in accordance with the preferred embodiments of the present invention, are sequentially arranged burst fields of constant amplitude and constant frequency offset in a pre-defined pattern from the center line of the data sector.

The ID sync field of the servo 1 field is also written at constant frequency and voltage, though centered on the track center line. The ID sync field allows the read/write controller to distinguish the first bit of the ID field. The ID field is used to store the cylinder, sector, and head numbers.

Finally, the data sync fields are constant frequency and amplitude fields provided to define the first bits of the respective data fields 1 and 2. The read/write controller synchronizes to the frequency of the data sync field. The first discontinuity in the sync frequency is therefore taken as the first data representative transition.

Referring now to FIG. 4, task execution as performed by the microcontroller 24 is shown mapped against the real time occurrence of the servo 1 and 2 fields with respect to a read/write head 20. The basic real time relations pertinent to the present invention are set forth in Table 4.

TABLE 4

| Disk Rotational Speed | 3550 rpm |
|---|---|
| Average Access Time | 19 millisecs. |
| Minimum Track-to-Track Transition Time | 28 microsecs. |
| Sector Period | 433 microseconds |
| Average Track Seek Rate | 15 tracks/sec. |
| Time Over Burst (each) | 2.665 microsecs. |
| Bytes Read per Track at Max Seek Rate | 43 bytes/track |
| Time over Gray Code | 5.33 microsecs. |
| Out of Round Error | ±1.27 micrometers |
| Core Write Fringe Width | 4 micrometers |

Specifically, a sector task is initiated in response to a countdown timer interrupt just prior to the occurrence of the servo 1 field. From this interrupt, the microcontroller 24 enables the control support circuit 30 to detect and process the sector mark field. A control value is then provided to the spin motor controller 34 to commutate the spin motor 14.

As shown in FIG. 5, the sector mark field is defined by the trailing end of the servo sync filled gap field and the sector mark. The gap field is another constant amplitude constant and frequency field. The sector mark is defined as the first read data transition following the absence of any servo sync transitions for three bytes of servo sync clock cycles. The time of occurrence of the sector mark is recorded by a hardware timer within the microcontroller 24 for use in subsequent tasks as well as scheduling the countdown timer interrupt necessary for processing the servo 2 field.

During the sector task, the gray code and sector bursts are captured by the control support circuit 30 via a raw data transfer line of the control lines 54 as coupled to the read/write controller 36. An automatic gain control circuit (AGC) is provided to adjust the amplitude of the raw data signal. In anticipation of the gray code and servo burst fields, the read/write controller is enabled by the microcontroller 24 to boost the gain of the AGC to compensate for reduced signal amplitudes. Although the AGC would automatically adjust its gain, the response time of the AGC is enhanced by direct adjustment of its gain just prior to or at the beginning of the gray code field. Capture of the gray code, though also earlier enabled by the microcontroller 24 during the servo sync corresponding portion of the sector task, is triggered by a sector mark signal produced upon detection of the sector mark. Similarly, capture of the four servo burst fields is triggered following a predefined delay, equal to the gray code length, following detection of the servo mark. The actual capture of the analog read amplitudes corresponding to each of the servo burst fields is performed by four sample and hold circuits individually gated to match the real time occurrence of the respective servo burst fields.

Meanwhile, the microcontroller 24 completes the sector task and transitions to a spin motor control task. The primary function of spin control task is to determine any rotational speed error of the spin motor 14 based on the previous actual and expected time of occurrence of the sector mark. A spin rate adjustment value may then be determined for use in the next servo 1 field sector task.

Next, an actuator task is executed by the microcontroller 24. This task is initiated subsequent to the A/D conversion of the D servo burst field. The first action undertaken by the microcontroller 24 in execution of the actuator task is to determine whether an actuator seek operation is pending or on offtrack error was prior determined. In either case, execution continues with a setup of a corresponding seek operation for subsequent execution. If, however, track following is to be performed, the four servo burst corresponding digital values are processed by the microcontroller 24 to derive a quadrature-based track following error value ($T_{ERR}$). Assuming that the B and C servo burst fields overlap the center line of the current data sector (known by whether the current track numbering is odd or even), the quadrature processing of the servo burst field values is done in accordance with Equation 1:

$$T_{ERR}=(A+B)-(C+D) \qquad \text{Eq. 1}$$

Where the A and D sector bursts overlap the center line of the current data sector, i.e., every other track, the quadrature processing is performed in accordance with Equation 2:

$$T_{ERR}=(C+D)-(A+B) \qquad \text{Eq. 2}$$

A positive track following error result is interpreted to indicate that the read/write head needs to be moved toward the inner diameter of the disk 12. The magnitude of the result gives an indication of the distance to the track center line. Thus, the microcontroller 24 may readily compute an error adjustment value based on the polarity and magnitude of the quadrature derived track following error. The error adjustment value is combined with the current actuator position control value and written to the digital-to-analog converter of the actuator controller 32. The adjusted analog actuator position control signal thereby produced by the actuator controller 32 results in a corrective change in the position of the actuator assembly 16 and the head 20 relative to the current data track.

The microcontroller 24 then transitions to a read/write task. Execution of the read/write task provides for the set up, continuance, or completion of the transfer of data with respect to the current data sector.

Finally, any pending seek operation is executed by the microcontroller 24 just prior to the conclusion of the read/write task. In general, the seek operation selected during the actuator task determines an actuator position value to initiate, continue, or complete a seek operation of the actuator assembly. This position value is now provided to the D/A converter of the actuator controller 32. The read/write task then completes with the execution of a return from interrupt instruction.

The sector task of the servo 2 field is initiated in response to the countdown timer interrupt as scheduled in the servo 1 sector task. The microcontroller 24 then executes sector, actuator, read/write and seek tasks that are substantially identical to their counterparts executed with respect to the servo 1 field, including scheduling the count down timer interrupt for the next sector's servo task start.

The balance of the sector period not otherwise spent processing the servo 1 and servo 2 fields is used to execute the interface task and, if active, the monitor task. Thus, the microcontroller 24 operates as an essentially multi-tasking processor in the control and management of the disk drive system 10.

Figure 6:
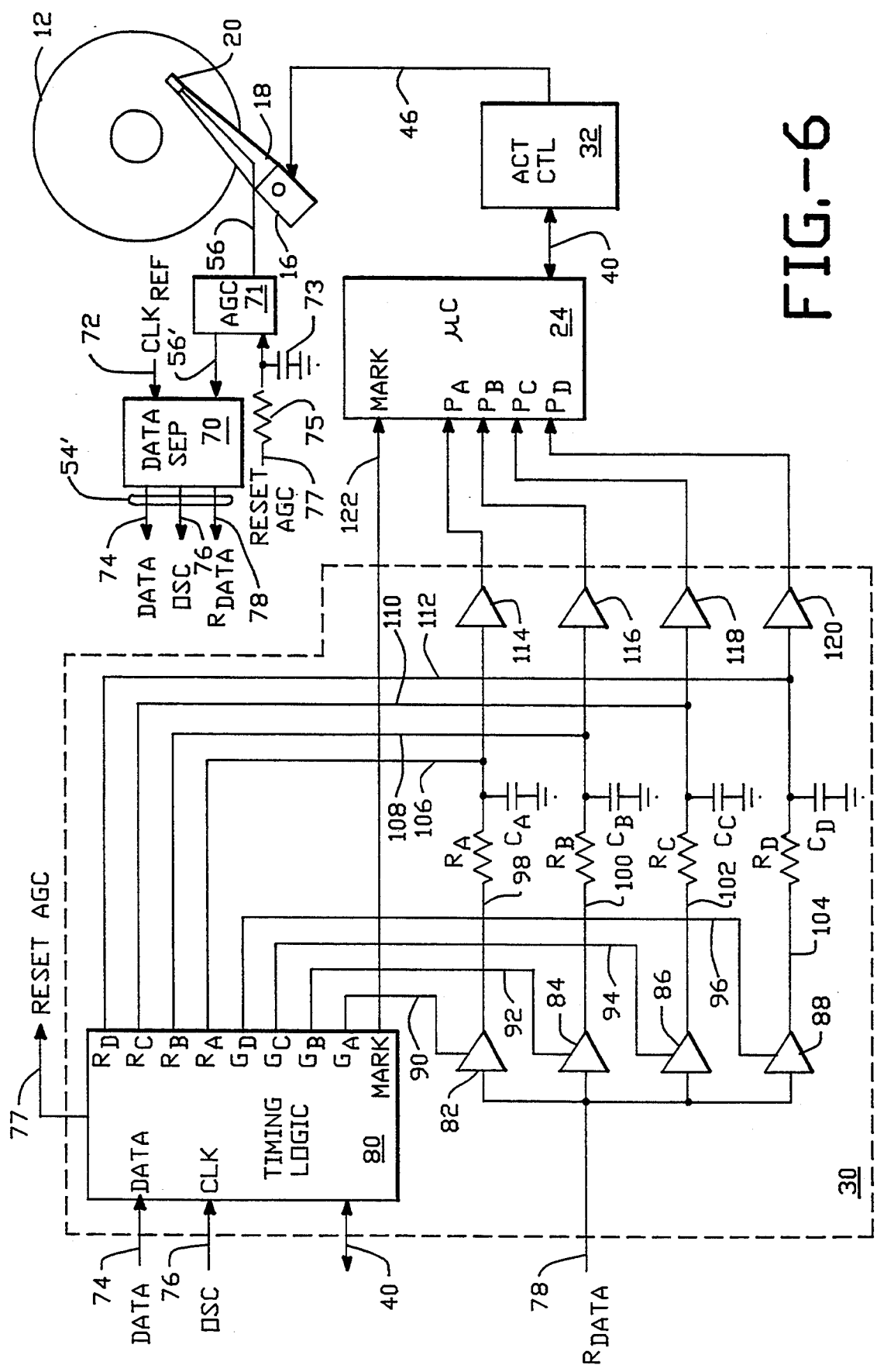
FIG. 6 provides a simplified block diagram of the servo burst capture circuitry of the present invention.

FIG. 6 details the servo burst capture circuitry used in the preferred embodiments of the present invention. An AGC 71, of the read/write controller 36, processes the raw data input from the read/write head 20 via the raw data line 56. Although implemented as part of an application specific integrated circuit (ASIC), the AGC 71 is functionally equivalent to conventional AGCs, such as the National Semiconductor, Inc. 8464 AGC. The gain of the AGC 71 is inversely proportional to the voltage across a capacitor 73, coupled between ground and an input line of the AGC 71. The voltage across the capacitor 73 is driven by the AGC 71 as part of its gain control feedback loop. In accordance with the preferred embodiments of the present invention, a small value resistor is also coupled to the capacitor input line of the AGC 71. While normally open circuited, the resistor provides a current path to allow at least a partial discharge of the voltage across the capacitor 73, and a corresponding immediate boost in the gain function of the AGC 71. The raw data amplitude on the AGC output line 56' is nominally 500 millivolts, peak to peak, single ended, in the preferred embodiments of the present invention. However, due to overlap erasure in the gray code fields and reduced width of the burst fields, the comparable raw data amplitude for these fields may be typically 350 millivolts. By coupling the resistor 75 to ground, preferably through an open drain transistor, for a short period of time chosen in view of the RC time constant of the capacitor 73 and resistor 75, the voltage across the capacitor 73 can be reduced in a controlled manner sufficient to immediately boost the gray code and servo burst raw data amplitude to the desired 500 millivolts. The resistor and capacitor values can be chosen so that the discharge time of the capacitor 73 is substantially faster than the intrinsic control loop response time of the AGC 71. In a preferred embodiment of the present invention, a 1000 ohm resistor 75 and 0.01 microfarad capacitor 73 is used. A grounding pulse of approximately 500 nano seconds provides the desired AGC gain adjustment.

A data separator 70, of the read/write controller 36, receives the AGC processed raw data via raw data line 56'. Based on a crystal controlled clock reference signal provided on a clock reference line 72 to the data separator 70, separated data and the formerly encoded data clock signal are provided on a data line 74 and an oscillator line 76, respectively. A buffered raw data signal is also output on a line 78 from the data separator. These lines, 74, 76, 78 are a subset 54' of the control lines 54 interconnecting the read/write controller 36 and control support circuit 30, as shown in FIG. 1.

The data and oscillator lines 74, 76 connect to a timing logic block 80 within the control support circuit 30. The timing logic block 80 includes a sector mark detection circuit, a gray code serial shift register and dedicated timing logic for enabling capture of the servo burst fields. The function of the timing logic block 80 is enabled in response to a control word written by the microcontroller 24 at the beginning of its sector task. Once enabled, a reset AGC signal is provided via line 77 to the resistor 75 to initial the AGC gain adjustment. The timing logic block 80 removes the reset AGC signal when the adjustment is completed. Upon detect. ion of a sector mark, the timing logic block 80 provides a sector mark signal via line 122 to the microcontroller 24. Simultaneously, the gray code serial shift register is enabled to sequentially shift in the eight gray code data bytes. Since the clocking of gray code bits is done synchronous with the data clock, registration of the read data is maintained through the reading of the gray code and all subsequent operations of the timing logic block 80. Upon completion, a gate A (GA) signal is provided to a full wave rectifier configured operational amplifier 82 via enable line 90. The input of the operational amplifier 82 is coupled to the raw data line 78. When enabled, the operational amplifier 82 provides a voltage corresponding to its input voltage on the output line 98. A resistor $R_A$ and capacitor $C_A$ are coupled in a single pole, low-pass configuration to an output line 98. Preferably, the resistors $R_{A-D}$ and capacitors $C_{A-D}$ have values of 150 ohms and 0.001 microfarads respectively. When subsequently disabled by the withdrawal of the $G_A$ signal, the operational amplifier 82 switches to a high impedance output state thereby effectively capturing an analog voltage across the capacitor $C_A$ proportional to the read amplitude of the A sector burst field. The voltage across the capacitor $C_A$ is coupled to a high-impedance input positive gain operational amplifier 114. In the preferred embodiments of the present invention, the gain is fixed at 2.5:1. The output of the operational amplifier 114 is, in turn, coupled to a first multiplexed input ($P_A$) of an analog-to-digital converter provided within the microcontroller 24.

The timing logic block 80 removes the gate A enable signal from the operational amplifier 82 after approximately 2.665 microseconds; the period of time that the read/write head 20 is over the A servo burst field. At the same time a gate B ($G_B$) enable signal is provided to an operational amplifier 84 via an enable line 92. The gate B enable signal is maintained for the duration of the B servo burst field and then withdrawn. Thus, an analog voltage corresponding to the B servo burst is captured by the capacitor $C_B$. This voltage is separately provided via an operational amplifier 116 to a second multiplexed input ($P_B$) of the microcontroller 4 analog-to-digital converter.

In similar fashion, gate C ($G_C$) and gate D ($G_D$) enable control signals are provided to operational amplifiers 86, 88 to sequentially capture the C and D servo burst field read voltages on capacitors $C_C$ and $C_D$. These voltages are provided via operational amplifiers 118, 120 to the $P_C$ and $P_D$ multiplexed inputs of the microcontroller 24 analog-to-digital converter. Consequently, the circuitry of the control support circuit 30 provides an efficient yet simple circuit for capturing the quad-servo burst provided in accordance with the present invention.

Although captured, the analog voltages corresponding to the quad-servo bursts must still be converted to digital values. In accordance with the present invention, flash conversion of the analog values is not required. Rather, the onboard multiplexed input analog-to-digital converter of the microcontroller 24 is adequate to sequentially convert the analog values in time for the microcontroller 24 to effect an actuator position adjustment prior to any loss of significance of the servo burst information.

Once the microcontroller 24 has processed the converted digital servo burst values, the capacitors $C_{A-D}$ must be cleared in preparation for capturing the next sequence of servo burst fields. This is accomplished, in accordance with the present invention, by the timing logic block 80 enabling the connection of reset lines $R_{A-D}$ 106, 108, 110, 112, to ground after the servo bursts have been converted to digital values. Since the reset lines 106, 108, 110, 112 are coupled to the inputs of the buffer operational amplifiers 114, 116, 118, 120, respectively, the capacitors $C_{A-D}$ are effectively shorted and thereby cleared. The timing logic block 80 then returns the capacitors $C_{A-D}$ to an open circuited state with a zero voltage potential across the capacitors $C_{A-D}$.

Figure 7:
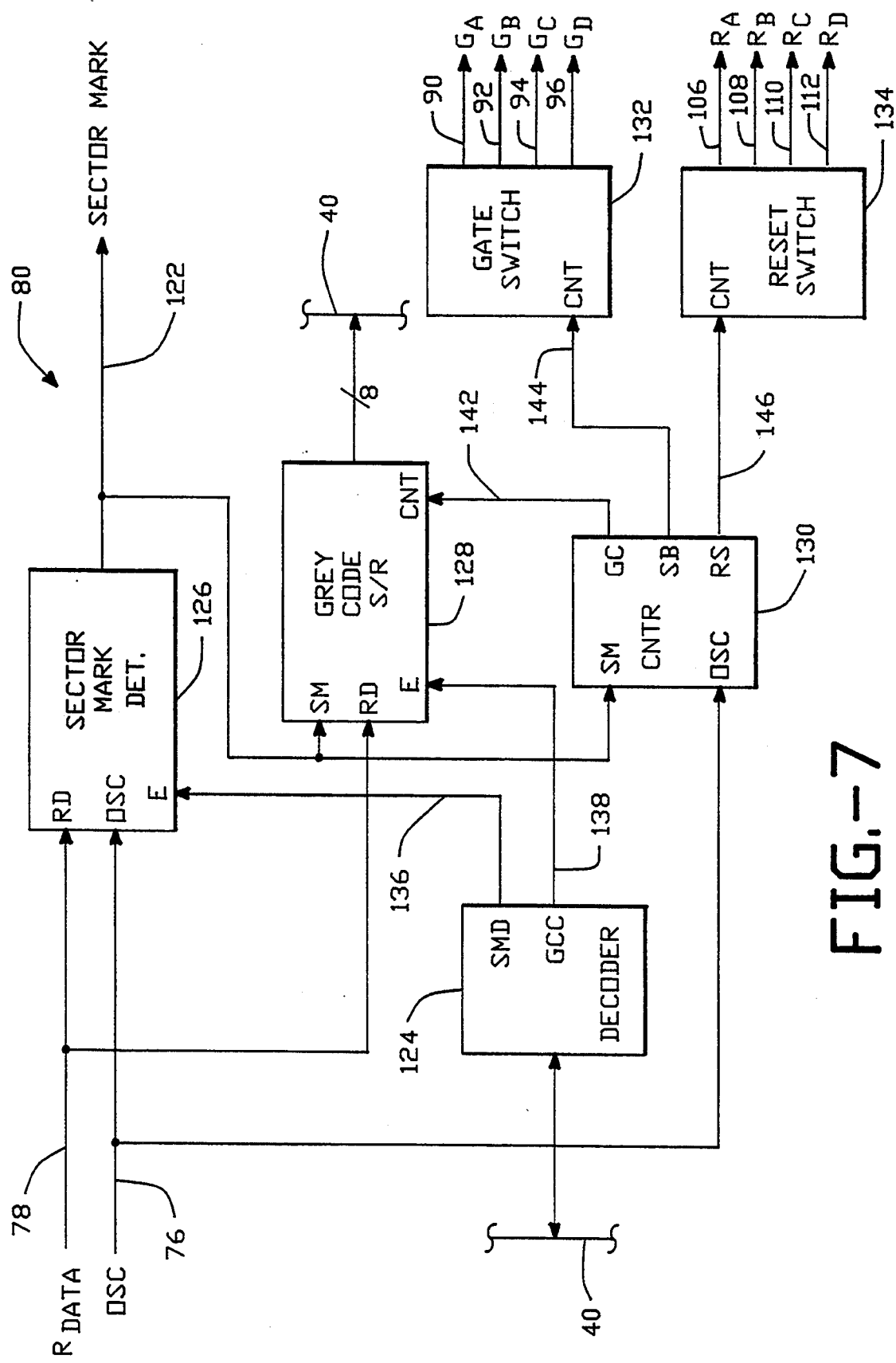
FIG. 7 provides a block diagram of the sector mark, gray code and servo burst capture control circuitry of the present invention.

FIG. 7 details the portion of the timing logic block 80 that is of significance to the present invention. A decoder 124 receives the control word from the microcontroller 24, via the bus 40, early in the sector task to enable the operation of a sector mark detector 126 and gray code shift register 128. The sector mark detector 126 continuously receives raw data from the raw data line 78 and the data clock from the oscillator line 76. The sector mark detector enable signal is provided from the decoder 124 via control line 136 in response to the control word being written to the decoder 124 by the microprocessor 24. Once enabled, the sector mark detector 126 provides a sector mark signal on its output line 122 upon detecting three bytes of servo sync clock cycles without a raw data transition.

The sector mark signal is also provided to the gray code shift register to synchronize the gray code capture operation to the beginning of the gray code field. As shown in FIG. 5, the gray code field immediately follows the sector mark. The gray code capture enable signal, as provided from the decoder 124 on the enable line 138, is provided simultaneously with the sector mark detector enable signal on control line 136. However, the gray code shift register 128 does not begin operation until it also receives the sector mark signal from the sector mark detector 126. A counter 130, operating from the data clock signal on line 76, provides a gray code count signal on control line 142 to the gray code shift register 128 to clock in each bit of the gray code field. The counter 130 halts the provision of count signals on the control line 142 once the full eight bytes of the gray code field have been serially shifted in. The counter 130 then begins providing count signals on the servo burst count lines 144 to a gate switch 132. The function of the gate switch 132, based on the count signals provided on the servo burst count lines 144, is to provide and then withdraw in succession the gate A-D enable signals on the gate control lines 90, 92, 94, 96. Each gate enable signal is provided for a duration of four bytes. Since this four byte duration is based on the data clock signal received by the counter 130 on the oscillator line 76, the gate enable signals are closely correlated with the real occurrence of servo burst fields with respect to the read/write head 20. Once all of the gate enable signals have been enabled and then disabled, the counter 130 ceases to provide count signals to the gate switch 132. Consequently, the gray code of the current sector has been captured by the gray code shift register 128 and the analog read data values corresponding to each of the servo burst fields have been captured by the capacitors $C_{A-D}$.

The gray code may be read from the gray code shift register 128 in response to the microcontroller 24 reading from eight successive memory locations mapped by the decoder 124 to the eight bytes stored in parallel by the gray code shift register 128.

The reset switch 134 operates to ground, in common, the reset lines 106, 108, 110, 112 for a duration sufficient to discharge the capacitors $C_{A-D}$. Operation of the reset switch 134 is initiated by the counter 130 through the provision of count signals to the reset switch via count line 146. This count signal is delayed from the occurrence of the sector mark signal by a period greater than the combined gray code and servo burst capture time and subsequent maximum A/D conversion time. In the preferred embodiments of the present invention, this delay is between 80 and 400 microseconds, and preferably approximately 200 microseconds. A second count signal provided by the counter 130 defines the discharge period. In the preferred embodiments of the present invention, a discharge period of at least 10 microseconds is used to discharge the capacitors $C_{A-D}$.

Figure 8:
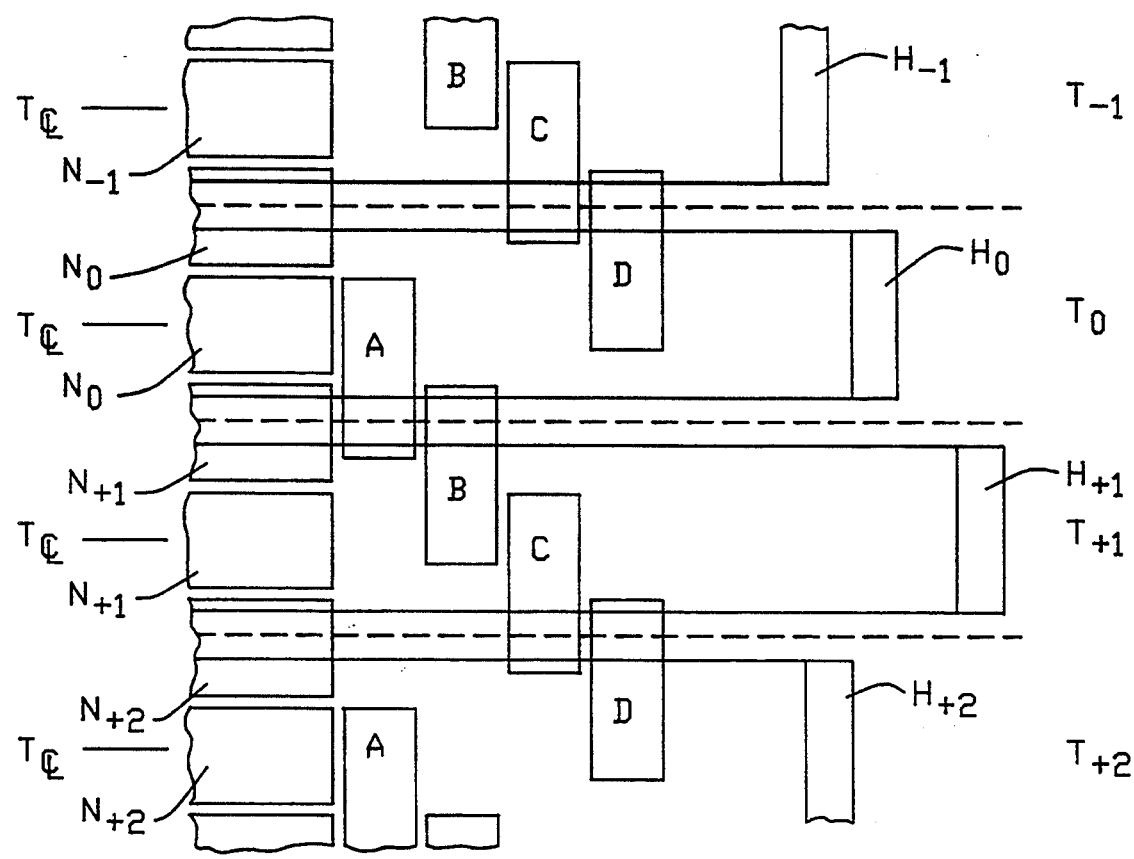
FIG. 8 is a detailed representation of the distribution of gray code and servo burst fields over a number of representative data tracks as provided in accordance with the present invention.

The gray code and quad-servo burst pattern of the present invention is illustrated in FIG. 8. A portion of the servo fields of sectors on adjacent tracks is shown. The continuous band of gray code is shown as the fields $N_{-1}$ through $N_{+2}$. The individual gray code fields are separated by gaps due to a phenomenon known as overlap erasure. This phenomenon is a consequence of the overlapping writing of the fields to the disk surface. A fringe field created at the borders of the read/write head when writing data to the disk surface will erase any pre-existing data for the width of the fringe field. For conventional read/write head voltages during writing, the overlap erasure width will range from between 100 and 160 microinches. While there is, therefore, a loss in recorded surface area carrying gray code information, the gray code fields of the present invention are written across the entire track width to form an effectively continuous gray code field band. Further, as previously noted, the gray code itself is chosen to encode the necessary information while differing as between the same sector on adjacent tracks by only a single bit. Consequently, even while seeking at high speed across the data tracks, an apparent gray code field read that captures a first portion of the gray code associated with one track and the remainder of the gray code field from an adjacent track will still generally yield an identification of the correct track number. An exception occurs where the single differentiating bit of the two adjacent tracks gray code is misread at the point that the read/write head is equally over adjacent gray code fields. In this exceedingly unique circumstance, there is an equal probability of reading the differentiating bit as either a one or a zero. Although this may result in decoding a wrong track number, the error is soft, i.e., non-repeating, and limited in the scope of the possible error. As a consequence of the present invention, there is no practical limitation on seek rate nor seek trajectory of the head with respect to gray code field crossings or servo bursts.

Also illustrated in FIG. 8 is the quad-servo burst pattern characteristic of the present invention. Each servo burst is independently written with a radial offset of one-half track width from the previous burst. The read/write head width, in accordance with the preferred embodiments of the present invention, is greater than or equal to sixty percent, but less than one hundred percent of the track width. Consequently, each servo burst overlaps its two radially-nearest servo bursts by less than one-half of a head width. The burst overlap, in terms of track width, is given as:

$$\text{Burst Overlap} = H - \frac{T}{2} \qquad \text{Eq. 3}$$

where H is the head width and T is the track width.

As illustrated in FIG. 8, a unique characteristic of the present invention is that none of the servo bursts are disposed symmetrically across the track center line of a data track. The servo bursts are servo track-written at one-half track offsets. However, the servo track-written tracks do not align with the data tracks that are subsequently used to store user data. Rather, as shown in FIG. 8, pairs of servo bursts, such as A and D with respect to track $T_0$ (and $T_{+2}$) and bursts B and C with respect to track $T_{-1}$ (and $T_{+1}$), will overlap a track center line. The overlap is asymmetric with respect to the individual servo bursts, but with respect to the pair displays a symmetric offset to either side of the data track center line. The other two servo bursts of a set of quad-servo fields are similarly offset in mirror symmetry from the same data track center line. The pattern of servo bursts repeats every other data track. However, the information content of the quad-servo burst field, and gray code fields, is the same for every data track.

Figure 9:
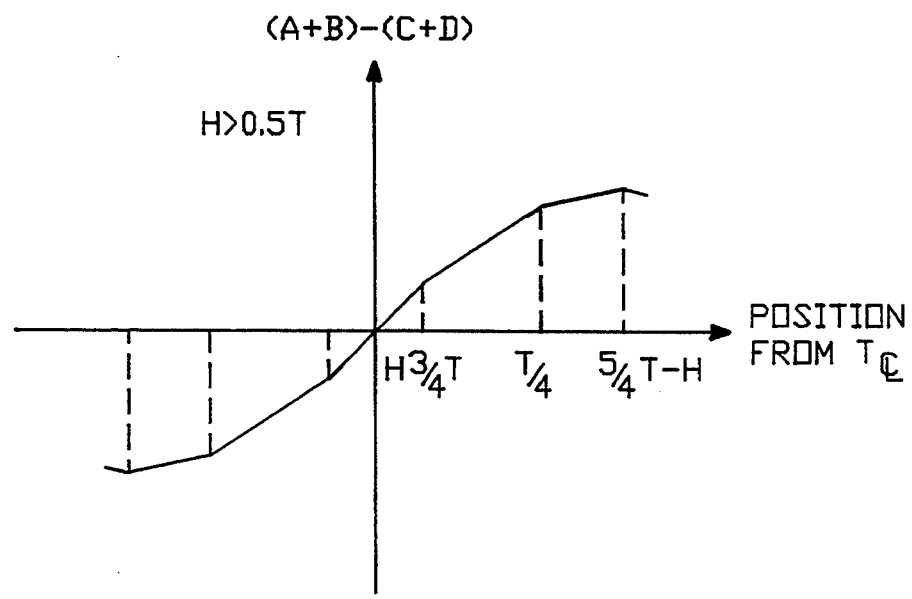
FIG. 9 provides a graphical representation of the track following quadrature result value of the present invention as a function of range from track center line.

As can be seen from FIG. 9, the position value determined by either Eq. 1 or Eq. 2 will vary nonlinearly depending on the read/write head offset from track center line. For an exemplary data track $T_{+1}$, a read head $H_{+1}$ following its track center line will read equal voltage amplitudes from the B and C servo bursts. Equal but smaller values will be read from the A and D bursts. Consequently, the track error $T_{ERR}$ will be zero. However, head drift toward track $T_0$ will result in a decrease, from zero, of the value computed by Eq. 1. As the center of the head moves radially past a point H-¾T from the track center line, the D servo burst field associated with $T_{+1}$ will no longer contribute to the value determined by Eq. 1. However, the contribution of the A and B servo burst fields will continue to increase at a rate greater than the decreasing contribution by the servo burst field C until the center point of the head radially moves past a point ¼T from the track center line. After this point, as the head continues to move away from the track center line, the contribution due to servo burst field B decreases. However, Eq. 1 will continue to give an increasing result value until the center point of the head moves past a distance of 5/4T-H from track center line. At this point, the upper or outer edge of the read head will begin to read the D servo burst associated with the track $T_0$. As shown in FIG. 9, the result value of Eq. 1 thereafter begins to decrease and is no longer a directly proportional indicator of the distance of the head from the correct track center line. Consequently, the present invention affords a servo track following lock range of ±5/4T-H.

Since the head width H must be at least one-half the track width T, the maximum lock range of the present invention is ±6/8T. However, in accordance with the practical implementation of the present invention, a servo track following lock range of approximately ±5/8T utilizing a head width of approximately 70% of the track width or greater can be realized.

A particular advantage of the present invention is that the head to track width limitation applies only to the effective write profile width of the head. Consequently, a magneto-resistive head having a read profile width substantially less that the write profile width can be used. The read head profile width should be at least equal to the burst overlap H-T/2.

Inasmuch as the servo track following algorithm of the present invention is implemented in firmware executed by the microcontroller 24, the rate of change in the result value of either Eq. 1 or Eq. 2, depending on the specific track being followed, can be used to determine whether the head has drifted past the threshold distance of 5/4T-H. That is, the microcontroller 24 is well-suited and can readily adjust for the nonlinearities in the result value of Eqs. 1 and 2.

Figure 10A:
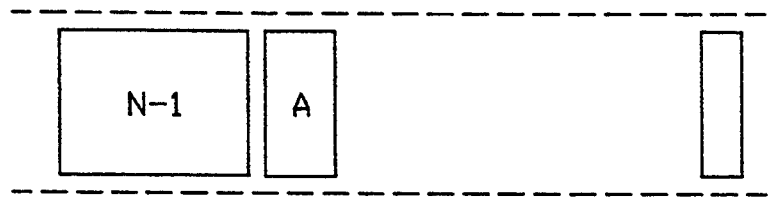
FIGS. 10a–e illustrate the sequential process for providing the continuous band gray code and quad-servo burst fields of the present invention.
Figure 10B:
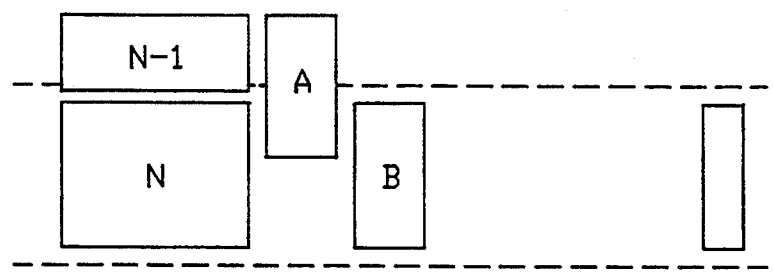

Referring now to FIGS. 10a–e, the process of providing the continuous gray code band and quad-servo burst pattern in accordance with a preferred embodiment of the present invention is illustrated. As shown in FIG. 10a, a gray code field $N_{-1}$ and servo burst A are written on the first pass of the head under the direction of a servo track-writer controller. The read/write head is then offset by ½ of a track width toward the inner diameter of the disk and a gray code field N and servo burst field B are written. The gray code field overwrites a portion of the $N_{311}$ gray code field. The overlap erasure associated with the writing of the gray code field N results in a gap between the $N_{-1}$ and N gray code fields.

Figure 10C:
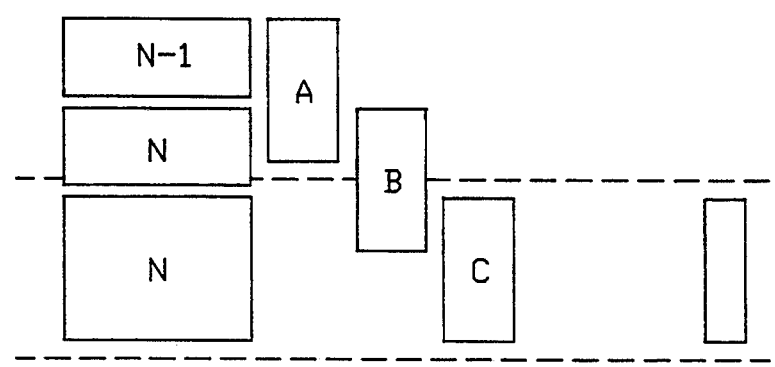

As shown in FIG. 10c, a second gray code field N is written, again offset by one-half of a track width toward that inner diameter of the disk. The servo burst field C is also written as shown. The servo burst pattern is completed as shown in FIG. 10d by the writing of a gray code field in $N_{+1}$ and servo burst D field.

Figure 10D:
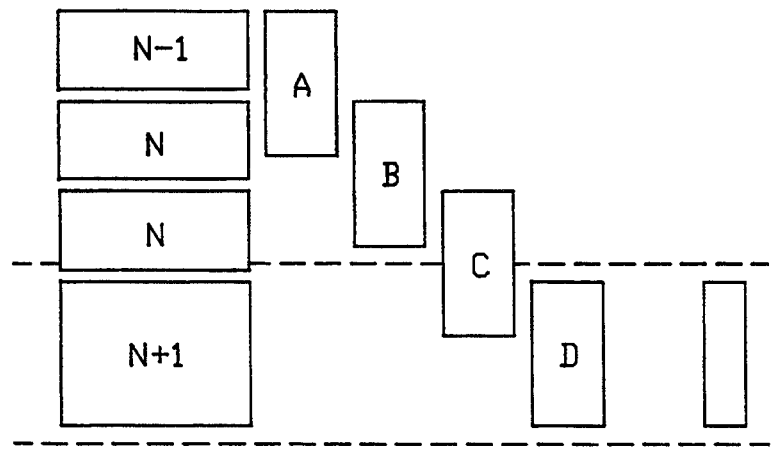
Figure 10E:
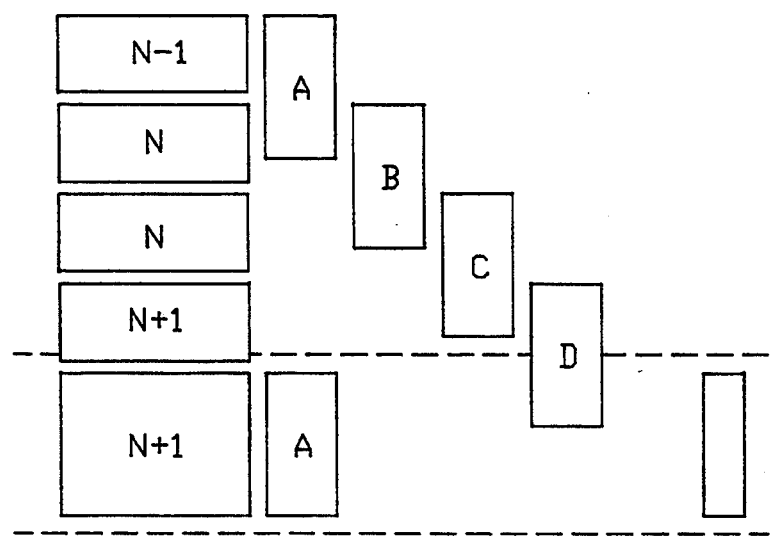

The next pass of the head, as shown in FIG. 10e, provides a second $N_{+1}$ gray code field partially overlapping the $N_{+1}$ provided in FIG. 10d. The same pass of the head is used to provide the next servo burst field A also at a one-half track offset from the fields provided in FIG. 10d. Consequently, the provision of the continuous gray code band and quad-servo burst fields of the present invention can be provided in a ready repeating pattern for all sectors and tracks.

Figures 11A, 11B, 11C:
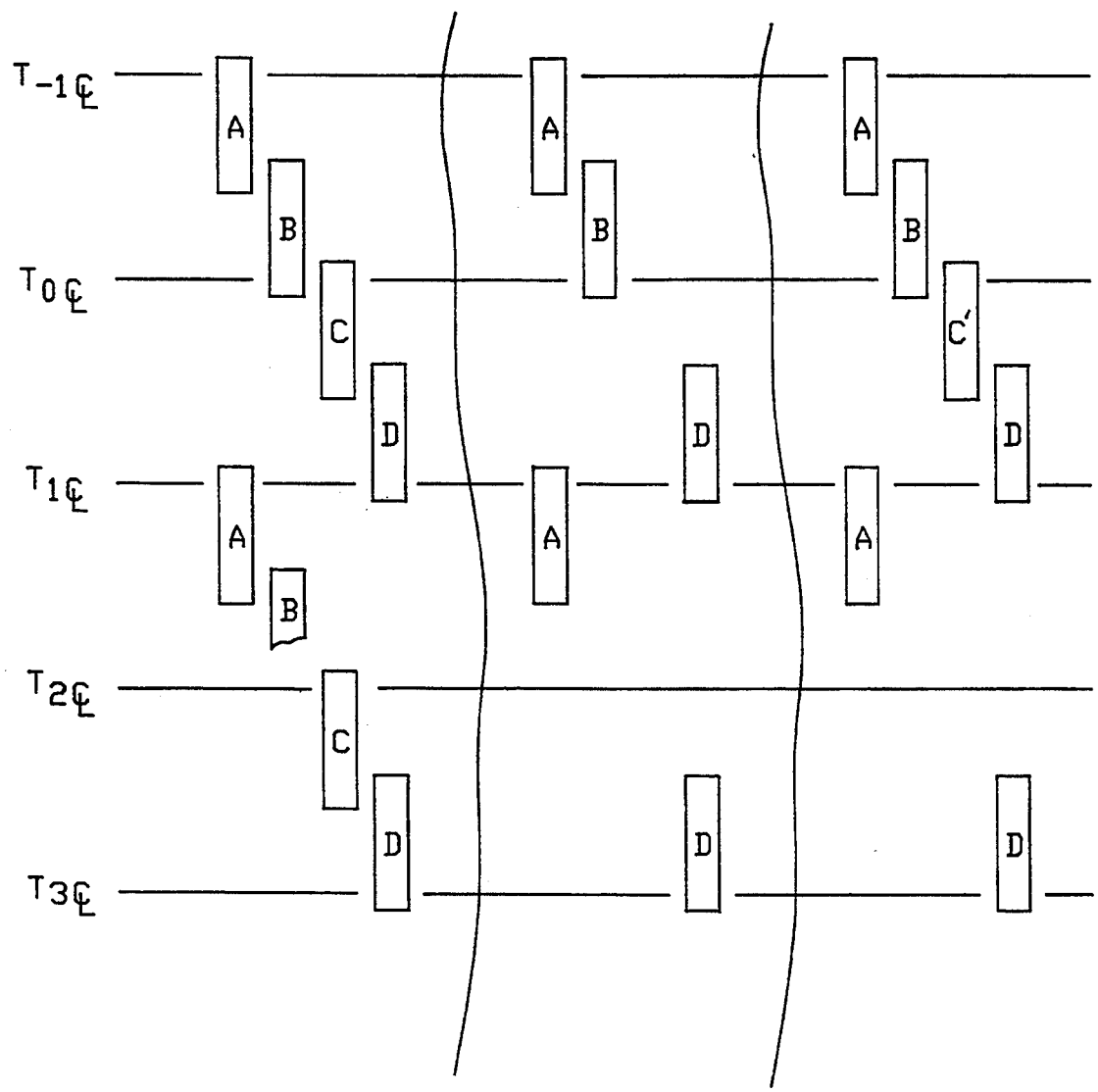
FIGS. 11a∝c illustrate a number of representative cases of the repair of servo burst information in accordance with the present invention.

Referring now to FIG. 11, the facility of the present invention to provide for the correction of servo track writer errors is illustrated. As shown in FIG. 11a, the servo burst field associated with the data track center line $T_0$ has been miswritten offset away from the track center line. The servo burst field B associated with the data track center line $T_2$ has been miswritten due to the presence of a surface defect at its position.

Referring now to FIG. 11b, the incorrect servo burst field C of track $T_0$ can be erased by track following exclusively on the B and D servo burst fields of the $T_0$ data track, though offset a quarter track in complimentary directions on two successive passes to completely erase only the servo burst C. In a similar manner, the incorrectly written servo burst field associated with the $T_2$ data track can be erased. However, since the physical defect will prevent direct correction of the servo burst field B, two additional erasure passes are also made to erase the servo burst field C associated with the $T_2$ data track.

In a single pass, a replacement servo burst field C' can be written in its proper location with respect to the data track $T_0$ as shown in FIG. 11c. Accordingly, what would otherwise be a permanent source of offtrack errors has been completely corrected with the provision of the servo burst C'.

The servo burst error associated with the data track $T_2$, however, cannot be completely corrected, though the presence of a servo burst co-located defect does not require that the entire sector be declared as defective. Rather, by removal of the defective servo burst B and its pair servo burst C, the present invention can still maintain an adequate degree of track following accuracy based solely on the presence of the servo bursts A and D. The loss of the B and C servo burst fields, however, does result in a loss of track following range at the affected track and sector.

Thus, a system and method of using a quad-servo burst pattern for embedded servo track following and a quadrature algorithm having a significantly increased servo track following lock range has been disclosed. Further, utilization of the quad-servo burst pattern in conjunction with a continuous gray code band further utilized in conjunction with a second gray code band and quad-servo burst pattern at a mid-sector location within each data sector permits disk drive systems to operate with a very high track density for the realization of a high performance and high capacity disk drive system.

As should be readily apparent from the foregoing disclosure, many modifications and variations of the present invention are possible in light of the above description of the preferred embodiments. It is therefore to be understood that, within the scope of the appended claims, the present invention may be practiced otherwise as specifically described herein.

We claim:

1. A servo pattern for providing servo information for the positioning of a head with respect to concentric data tracks provided on the surface of a data storage media, wherein each data track includes a series of data sectors, said servo pattern comprising plurality of servo burst fields provided in each data sector and in a series ordered along the length of each data sector, wherein a subset of at least two of said servo burst fields in a predetermined data sector define the data track center line of a predetermined data track as the mid-point of the mutual radial overlap of said subset and wherein each one of said plurality of servo burst fields radially uniformly overlaps its two radially-nearest ones of said plurality of servo burst fields, wherein each said subset includes a quad of servo burst fields, wherein the radial width (W) of a servo burst field is related to the track radial width (T) by 0.5T<W<=1.0T, wherein radially-nearest pairs of servo burst fields of said quad overlap by W-(T/2), and wherein a data track center line is defined as crossing at the radial mid-point in the overlap of a pair of servo burst fields, wherein said head obtains a read voltage amplitude (V) corresponding to the proportion of the whole of a servo burst field that it crosses over, wherein a quad of servo burst fields are designated as A, B, C, and D, respectively, and wherein said head is aligned with a predetermined data track center line when a position error signal equals $(V_A+V_B)-(V_C+V_D) =0$.

2. A servo pattern for providing embedded sector servo information for the positioning of a head with respect to a plurality of concentric data tracks provided on the surface of a data storage media, wherein each data track includes a plurality of data sectors, said servo pattern comprising four servo bursts associated with a respective data sector, said four servo bursts being distributed along a portion of the length of a respective data sector with the center points of said four servo bursts displaced radially from the associated track center line, wherein the center line of the associated data sector is defined as a line having a net zero radial offset from the center points of said servo bursts, and wherein at least three of said four servo bursts are used to generate a position error signal.

3. A disk drive control system operating from embedded servo control information comprising:
   a) media means for providing for the storage of servo information and data in sectors of concentric data tracks, said servo information including a quad of servo bursts symmetrically offset about a data track center line, a pair of said quad of servo bursts symmetrically overlapping said data track center line, the members of said pair being offset to opposite sides of said data track center line;
   b) actuator means, responsive to a position control signal, for positioning a head with respect to said data tracks; and
   c) control means, coupled to said actuator means, for controlling the positioning of said head with respect to said data tracks, said control means including means, coupled to said head, for obtaining a relative position value for each of said servo burst fields of a data sector, means for determining a track center line offset value as the difference of sums of pairs of said relative position values, and means, responsive to said track center line offset value, for providing said position control signal to said actuator means.

4. In a disk drive using a closed loop positioning system for controlling the position of a read/write head with respect to data tracks, each including a plurality of data sectors, provided on a rotating data storage media, the positioning system being responsive to servo information embedded in the data tracks, wherein the improvement comprises:
   a data sector format, aligned with a data track center line, for providing the embedded servo information including a sector mark, a gray code field, first, second, third and fourth servo bursts, and a data field;
   wherein said gray code field includes a gray code for storing positioning information and that is provided with a gray code field width, extending radially from said data track center line, that is substantially the same as that of an associated data track;
   wherein said first, second, third and fourth servo bursts are provided with the center points of said first, second, third and fourth servo bursts displaced radially from said data track center line by the fractions $1.0(T)-s$, $0.5(T)-s$, $-0.5(T)+s$, and $-1.0(T)+s$, respectively, where T is the width of said associated data track and s is a constant greater than zero and less than $0.5(T)$; and
   wherein at least said first, second and third servo bursts are used to generate a data track center line position error value.

5. A hard disk drive using a closed loop positioning system for controlling the position of a data head with respect to a plurality of concentric data tracks, each data track including a plurality of data sectors, said hard disk drive comprising:
   a) a rotating data storage media, said data tracks being provided on a surface of said rotating data storage media;
   b) actuator means for moving a data head relative to the surface of said rotating data storage media; and
   c) control means, coupled to said data head for recovering servo information from the surface of said rotating data storage media, for controlling said actuator means to position said data head relative to a predetermined data track, said control means operating in response to servo information embedded in the data tracks in a predetermined pattern wherein each data sector includes a sector mark, a first gray code field, first, second, third and fourth servo bursts, a first data field, a mid-sector gap, a second gray code field, fifth, sixth, seventh and eighth servo bursts, and a second data field, wherein said first and second gray code fields include a gray code for storing positioning information and are provided with a gray code field width, perpendicular to the data track center line, substantially the same as that of the data sector, and wherein said first, second, third, and forth servo bursts are distributed adjacent one another along a corresponding portion of the length of a respective data sector with the center points of said servo bursts displaced perpendicular to the track center line of their respective data sector by the fractions $1.0(T)-s$, $0.5(T)-s$, $-0.5(T)+s$, and $-1.0(T)+s$, respectively where T is the width of the data track and s is a constant greater than zero and less than $0.5(T)$, wherein at least said first, second and third servo bursts are used to generate a position error value representing a distance said data head is from the predetermined data track.

6. A servo pattern for providing servo information for the positioning of a head with respect to the data track center line of respective concentric data tracks provided on the surface of a data storage media, wherein each data track includes a series of data sectors, said servo pattern comprising
   a plurality of servo burst fields provided in a series along a length-wise portion of a data sector of a predetermined data track,
   a first two of said plurality of servo burst fields provided to define the data track center line of said predetermined data track as the mid-point of a first mutual radial overlap of said first two of said plurality of servo burst fields,
   a second two of said plurality of servo burst fields provided non-overlapping the data track center line of said predetermined data track, each one of said second two of said plurality of servo burst fields having a second mutual radial overlap with a respective one of said first two of said plurality of servo burst fields, said first mutual radial overlap and said second mutual radial overlap being substantially equal, and
   wherein at least the first two of said plurality of servo burst fields and one of the second two of said plurality of servo burst fields are used to generate a position error signal.

7. The servo pattern of claim 6 wherein a servo burst field of said plurality of servo burst fields has a servo burst width extending radially from the data track center line of said predetermined data track and wherein said first mutual radial overlap and said second mutual radial overlap are less than one-half of said servo burst width.

8. The servo pattern of claim 7 wherein the center points of each two radially nearest ones of said plurality of servo burst fields are offset radially by a distance of one-half of the radial width of said predetermined data track.

9. The servo pattern of claim 6 or 8 wherein each one of said second two of said plurality of servo burst fields overlaps the data track center line of a respective one of the two data tracks radially adjacent said predetermined data track.

10. The servo pattern of claim 9 wherein said servo pattern is provided twice in each data sector of a predetermined data track.

11. A servo pattern for providing servo information for the positioning of a head with respect to concentric data tracks provided on the surface of a data storage media, wherein each data track includes a series of data sectors, said servo pattern comprising a plurality of servo burst fields provided in each data sector and in a series ordered along the length of each data sector, wherein a subset of at least two of said servo burst fields in a predetermined data sector define the data track center line of a predetermined data track as the midpoint of the mutual radial overlap of said subset and wherein each one of said plurality of servo burst fields radially uniformly overlaps its two radially-nearest ones of said plurality of servo burst fields, wherein each said subset includes a quad of servo burst fields,, wherein the radial width (W) of a servo burst field is related to the track radial width (T) by $0.5T<W<=1.0T$, wherein radially-nearest pairs of servo burst fields of said quad overlap by $W-(T/2)$, and wherein a data track center line is defined as crossing at the radial mid-point in the overlap of a pair of servo burst fields, wherein said head obtains a read voltage amplitude (V) corresponding to the proportion of the whole of a servo burst field that it crosses over, wherein a quad of servo burst fields are designated as A, B, C, and D, respectively, and wherein said head is aligned with a predetermined data track center line when a position error signal equals $(V_C+V_D)-(V_A+V_B) = 0$.

12. A servo pattern for providing servo information for the positioning of a head with respect to concentric data tracks provided on the surface of a data storage media, wherein each data track includes a series of data sectors, said servo pattern comprising a plurality of servo burst fields provided in each data sector and in a series ordered along the length of each data sector, wherein a subset of at least two of said servo burst fields in a predetermined data sector define the data track center line of said predetermined data track as the midpoint of the mutual radial overlap of said subset, and wherein at least three of said plurality of servo bursts are used to generate a position error signal allowing said head to be aligned with said predetermined data track center line.

13. A hard disk drive using a closed loop positioning system for controlling the position of a data head with respect to a plurality of concentric data tracks, each data track including a plurality of data sectors, said hard disk drive comprising:
   a) a rotating data storage media, said data tracks being provided on a surface of said rotating data storage media;
   b) actuator means for moving a data head relative to the surface of said rotating data storage media; and
   c) control means, coupled to said data head for recovering servo information from the surface of said rotating data storage media, for controlling said actuator means to position said data head relative to a predetermined data track, said control means operating in response to servo information embedded in the data tracks in a predetermined pattern wherein each data sector includes a first gray code field and a plurality of servo bursts, and wherein a data head track following accuracy for the predetermined data track is maintained upon an occurrence of a defective pair of the plurality of servo bursts.

14. The hard disk drive of claim 13, further comprising:
   means, coupled to the control means, for correcting a defective servo burst in the plurality of servo bursts.

15. A method for providing a servo pattern on a disk using a servo track writer head, comprising the steps of:
   writing a first gray code field and a first servo burst;
   offsetting the servo track writer head approximately one-half of a track width;
   writing a second gray code field and a second servo burst;
   offsetting the servo track writer head approximately one track width;
   writing a third gray code field and third servo burst;
   offsetting the servo track writer head approximately one and one-half of a track width; and
   writing a fourth gray code field and fourth servo burst.

16. The method of claim 15, wherein the step of writing a second gray code field and second servo burst uniformly overlap the first gray code field and first servo burst.

17. The method of claim 16, wherein the steps further comprise:
   writing a fifth gray code field and fifth servo burst uniformly overlapping the fourth gray code and fourth servo burst.

18. A method for correcting a defective servo burst in a servo pattern having at least three servo bursts on a disk using a data head, comprising the steps of:
   aligning the data head with a pair of non-defective servo bursts in the servo pattern;
   erasing the defective servo burst; and
   writing a servo burst at the defective servo burst location in the servo pattern on the disk.

* * * * *